(12) United States Patent
Lee et al.

(10) Patent No.: US 6,998,736 B2
(45) Date of Patent: Feb. 14, 2006

(54) APPARATUS AND METHOD FOR CONTROLLING DRIVING OF LINEAR MOTOR

(75) Inventors: Jae-Mo Lee, Seoul (KR); Kyung-Bum Heo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 10/649,629

(22) Filed: Aug. 28, 2003

(65) Prior Publication Data
US 2004/0108825 A1 Jun. 10, 2004

(30) Foreign Application Priority Data
Dec. 6, 2002 (KR) .................. 10-2002-0077413

(51) Int. Cl.
*H02K 41/00* (2006.01)
(52) U.S. Cl. .................................................. 310/12
(58) Field of Classification Search .............. 310/12; 417/417; 368/157
See application file for complete search history.

(56) References Cited

U.S. PATENT DOCUMENTS

| | | | |
|---|---|---|---|
| 3,149,254 A * | 9/1964 | Carter et al. | 310/12 |
| 3,255,582 A | 6/1966 | Zam | 368/250 |
| 3,455,102 A | 7/1969 | Wolf | 368/73 |
| 3,798,889 A | 3/1974 | Chadwick | 368/73 |
| 3,968,417 A | 7/1976 | Dials | 320/107 |
| 4,228,806 A | 10/1980 | Lidow | 600/544 |
| 4,370,602 A | 1/1983 | Jones, Jr. et al. | 318/114 |
| 4,642,547 A * | 2/1987 | Redlich | 322/3 |
| 4,645,353 A | 2/1987 | Kavoussi et al. | 368/12 |
| 4,821,247 A | 4/1989 | Grooms | 368/63 |
| 5,089,998 A | 2/1992 | Rund | 368/72 |
| 5,282,181 A | 1/1994 | Entner et al. | 368/73 |
| 5,948,303 A | 9/1999 | Larson | 219/486 |
| 6,236,622 B1 | 5/2001 | Blackman | 368/10 |
| 6,753,665 B1 * | 6/2004 | Ueda et al. | 318/135 |

FOREIGN PATENT DOCUMENTS

| | | |
|---|---|---|
| KR | 2002-0054154 | 7/2002 |
| KR | 10-2003-75740 | 9/2003 |
| KR | 10-0404108 | 10/2003 |

OTHER PUBLICATIONS

English language Abstract of Korean 10-2003-75740, Oct. 2003.
English language Abstract of Korean 10-0404108, Oct. 2004.

* cited by examiner

*Primary Examiner*—Darren Schuberg
*Assistant Examiner*—Judson H. Jones
(74) *Attorney, Agent, or Firm*—Greenblum & Bernstein, P.L.C.

(57) ABSTRACT

An apparatus and method for controlling driving of a linear motor, which is configured to increase efficiency of a linear compressor and stably drive the linear motor when the linear motor is overloaded. The apparatus includes a detector that detects a current applied to a motor, a controller that outputs a control signal based on the detected current and a switch that varies the number of windings of the linear motor coil on the basis of the control signal.

13 Claims, 3 Drawing Sheets

APPARATUS AND METHOD FOR CONTROLLING DRIVING OF LINEAR MOTOR

RELATED APPLICATIONS

The present disclosure relates to subject matter contained in Korean Application No. 10-2002-0077413, filed on Dec. 6, 2002, which is expressly incorporated herein by reference it its entirety.

BACKGROUND OF THE INVENTION

1. Field of the Invention

The present invention relates to a motor, and an apparatus and method for controlling a driving of a linear motor mounted in a linear compressor.

2. Description of the Related Art

Generally, a linear compressor, especially, a linear motor arranged in a linear compressor is not provided with a crankshaft which converts a rotational movement into a linear movement and thus has reduced frictional loss. According to this, a compression efficiency of the linear compressor is better than that of a general compressor.

When the linear motor compressor is used in a refrigerator or an air conditioner, a stroke voltage input into the linear motor is varied to thus vary a compression ratio of the linear compressor, thereby controlling a freezing or cooling capacity.

The linear compressor will be explained with reference to FIG. 1.

FIG. 1 is a sectional view showing a linear compressor in accordance with the conventional art.

As shown in FIG. 1, the conventional linear compressor comprises: a casing 2 having a gas suction pipe 5 and a gas discharge pipe 1 installed therein. A frame unit 6 is installed in the casing 2 and a linear motor 100 is fixed to the frame unit 6 for a linear movement. A compression unit 7 is coupled to a movable element 100-3 of the linear motor 100 and is supported at the frame unit 6 and a resonance spring unit 4 is provided for elastically supporting the movable element 100-3 of the linear motor 100 for movement in a linear movement direction and thus inducing a resonance movement. Herein, the linear motor is composed of the movable element 100-3, an outer stator 100-1, and an inner stator 100-2.

The linear motor 100 installed in the linear compressor is composed of a coil having a plurality of windings. The linear motor 100 will be explained with reference to FIG. 2.

FIG. 2 shows an equivalence circuit of the motor arranged in the linear compressor in accordance with the conventional art.

As shown in FIG. 2, the equivalence circuit of the linear motor 100 is composed of one coil L having the predetermined number of winding and a resistor R. That is, the number of winding of the linear motor coil L is designed to correspond to a normal load.

However, in the linear compressor according to the conventional art, the number of winding of the linear motor coil is designed in advance so as to correspond to the normal load and a triac (not shown) which controls an alternating current power supplied to the linear motor when the motor is driven with a normal mode generates harmonics loss, thereby lowering a compressor efficiency.

That is, the conventional linear motor can not vary the number of winding of the inner coil, so that efficiency of the compressor is lowered by the harmonics loss.

Also, the linear motor mounted in the conventional linear compressor and having one coil stops when it is overloaded. That is, when the overload is generated at the linear motor, electric current for driving the linear motor can not be increased.

SUMMARY OF THE INVENTION

Therefore, an object of the present invention is to provide an apparatus and a method for controlling a driving of a linear motor, which is configured to increase the efficiency of a linear compressor (or in any other type of compressor or other device in which the linear motor is installed) by varying the number of winding of the linear motor coil on the basis of a current applied to the linear motor provided in the linear compressor.

Another object of the present invention is to provide an apparatus and a method for controlling driving of a linear motor, which is configured to stably drive a linear motor when the linear motor is overloaded by varying the number of winding of the linear motor coil on the basis of a current applied to the linear motor.

To achieve these and other advantages and in accordance with the purpose of the present invention, as embodied and as broadly described herein, an apparatus is provided for controlling driving of a linear motor, including: a current detector that detects a current applied to the linear motor installed in a linear compressor; a controller that outputs a control signal based on the detected current; and a switch that varies the number of winding of the linear motor coil on the basis of the control signal.

To achieve these and other advantages and in accordance with the purpose of the present invention, as embodied and broadly described herein, a method is also provided for controlling driving of a linear motor, including: detecting a current applied to the linear motor generating a control signal based on the detected current and varying the number of winding of the linear motor coil on the basis of the control signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
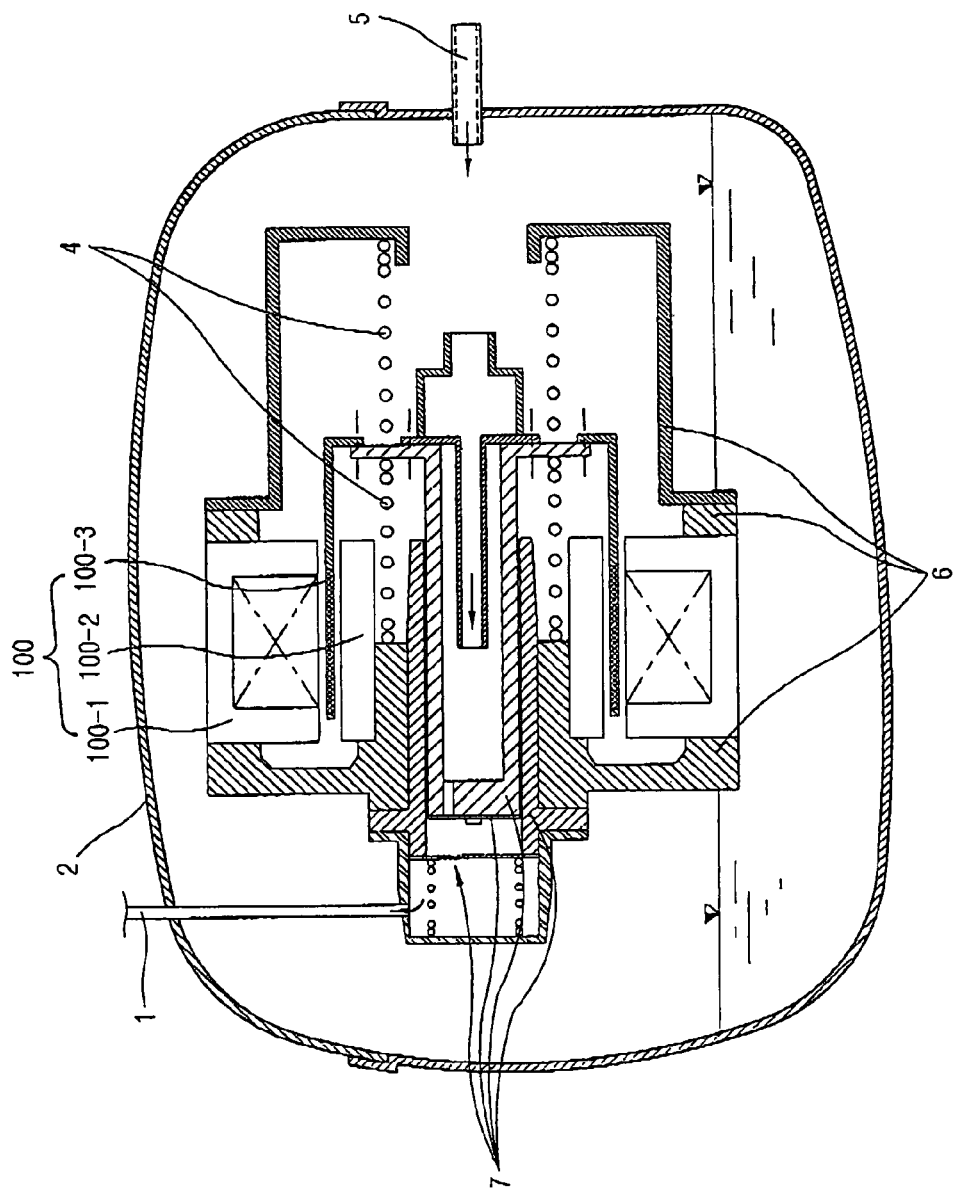
FIG. 1 is a sectional view showing a linear compressor in accordance with the conventional art.
Figure 2:
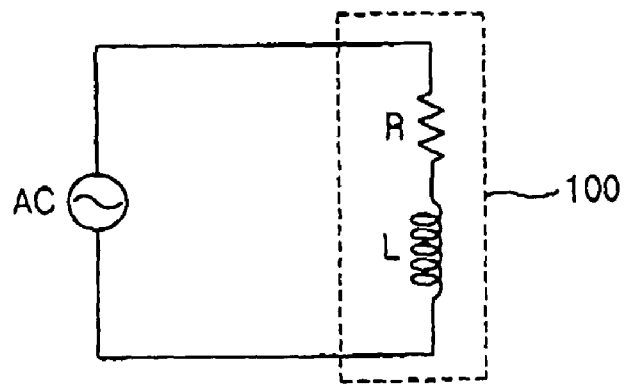
FIG. 2 shows an equivalence circuit of a motor arranged in the linear compressor in accordance with the conventional art.
Figure 3:
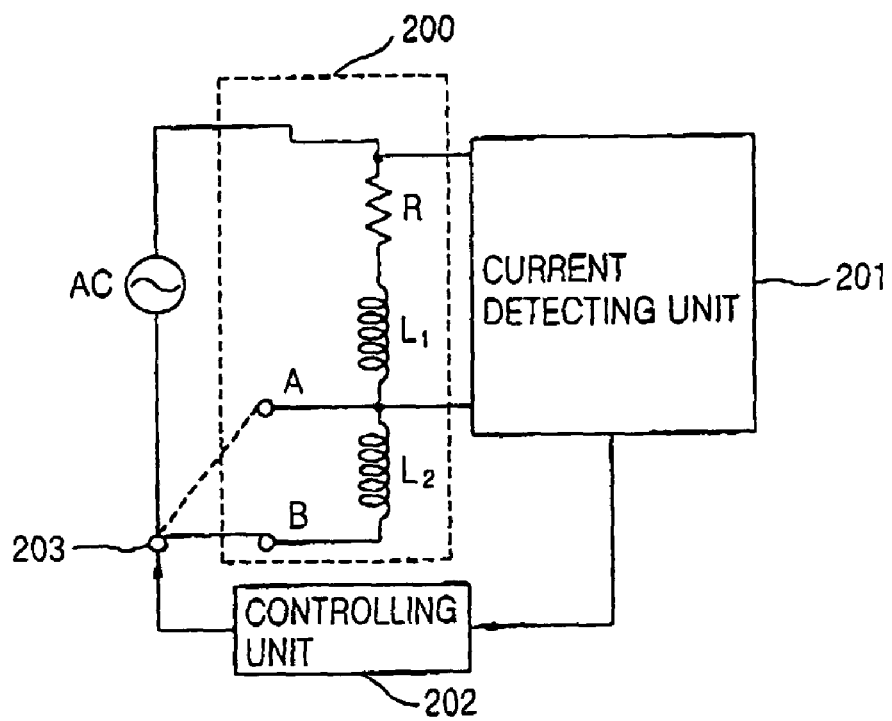
FIG. 3 shows an apparatus for controlling a driving of a linear motor according to the present invention.
Figure 4A:
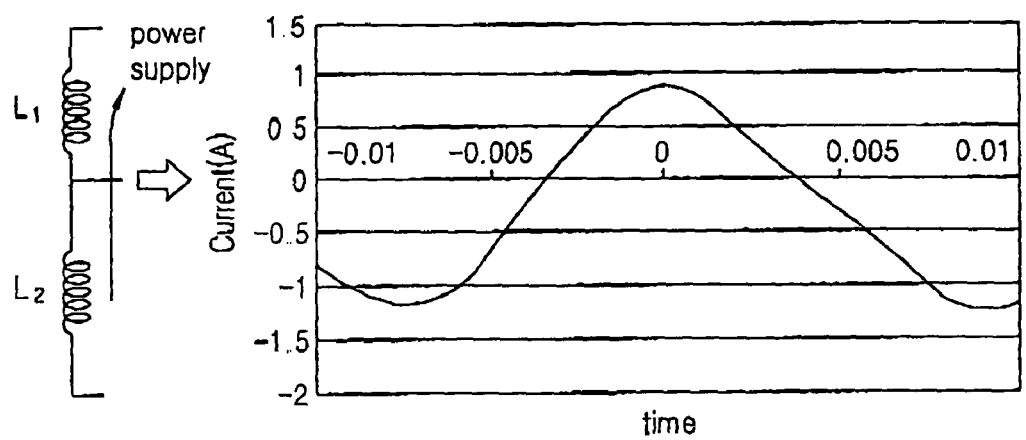
FIGS. 4A and 4B show waveforms of a current detected by a current detecting unit of FIG. 3.
Figure 4B:
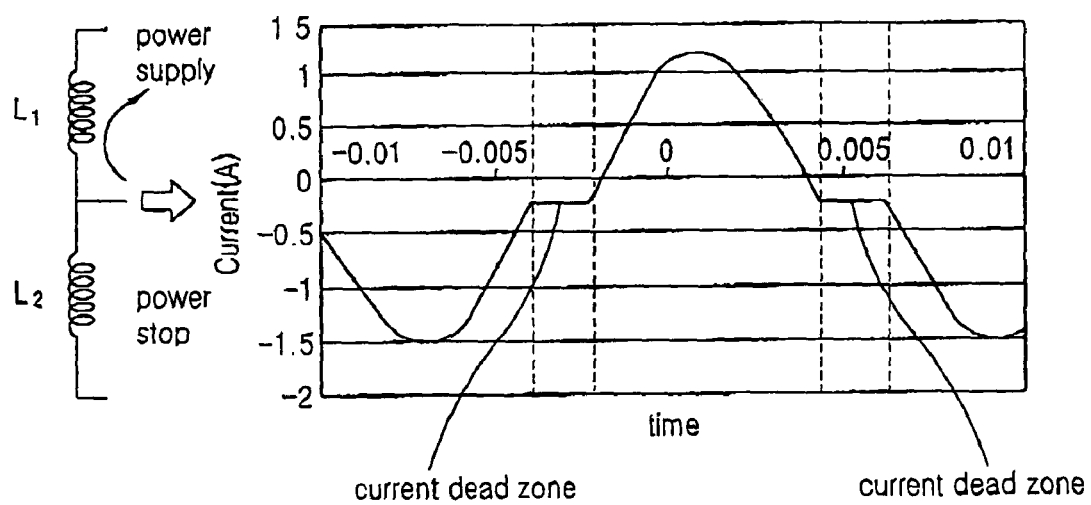

An apparatus and a method for controlling driving of a linear motor, which is configured to increase the efficiency of a linear compressor or other device employing the linear motor by detecting a current applied to the linear motor arranged in the linear reciprocating compressor, generating a control signal based on the detected current, and varying the number of winding of the linear motor coil on the basis of the control signal and which is configured to stably drive the linear motor when the linear motor is overloaded will be explained with reference to FIGS. 3, 4A, and 4B.

FIG. 3 shows an apparatus for controlling driving of a linear motor according to the present invention.

As shown in FIG. 3, the apparatus for controlling driving of a linear motor 200 arranged in the linear compressor (not shown) includes: a current detecting unit 201 that detects a current applied to the linear motor 200; a controlling unit 202 that outputs a switching control signal based on the detected current; and a switch that receives an alternating current power AC and varies the number of winding of the linear motor 200 according to the switching control signal. The linear motor linear 200 includes a first coil L1 wound with a first predetermined number of winding and a second coil L2 wound with a second predetermined number of winding and connected to the first coil in series. Also, an equivalence circuit of the linear motor 200 includes the two coils L1 and L2 respectively having the predetermined number of winding and a resistor R.

Accordingly, the switch 203 supplies the alternating current to the first coil L1 on the basis of the control signal or to the second coil L2 connected to the first coil L1 in series, thereby controlling a current applied to the linear motor 200. That is, the switch 203 is connected to the first coil L1 or to the second coil L2 together with the first coil L1 connected in series on the basis of the control signal, thereby varying the number of winding of the linear motor coil. Also, the linear motor coil can be formed with a plurality of coil units, not only two. Additionally, the first and second predetermined number of winding may be equal but need not be equal to each other.

Hereinafter, operations of the apparatus for controlling a driving of the linear motor will be explained with reference to FIGS. 4A and 4B.

FIGS. 4A and 4B show waveforms of a current detected by a current detecting unit of FIG. 3.

First, the current detecting unit 201 detects a current applied to the linear motor 200 and outputs the detected current to the controlling unit 202.

The controlling unit 202 outputs a first control signal for driving the linear motor 200 into a high efficiency mode to the switch 203 when the linear motor 200 arranged in the compressor is initially driven. Herein, the high efficiency mode is a mode for supplying the alternating current power AC through both the first coil L1 and the second coil L2 connected to the first coil L1 in series when the linear motor 200 is driven. That is, the high efficiency mode decreases the current applied to the linear motor 200 by increasing the number of winding of the linear motor coil and thus decreases harmonics loss by a triac which controls the alternating current power supplied to the motor 200, thereby increasing the efficiency of the compressor.

The switch 203 is connected to B contact point of the second coil L2 by receiving the first control signal. That is, the linear motor 200 is driven by receiving the alternating current power AC through both the first coil and the second coil connected to the first coil in series. Herein, the switch 203 preferably uses a relay.

Accordingly, if the linear motor 200 is driven in the high efficiency mode, the harmonics loss by the conventional triac is decreased, thereby increasing efficiency of the compressor.

In the meantime, when a current dead zone, where a current value output from the current detecting unit 201 is zero for a predetermined time does not exist as shown in FIG. 4A, the control unit 202 recognizes that the linear motor is in an overload state, and thereby outputs a second control signal for driving the linear motor 200 in an overload corresponding mode to the switch 203. Herein, the overload corresponding mode compensates a deficient voltage due to the overload of the motor, thereby preventing a phenomenon of voltage deficiency. That is, the overload corresponding mode decreases the number of winding of the linear motor coil when the linear motor 200 is overloaded and thus increases the current applied to the linear motor 200, and thereby drives the linear motor 200 in a stable fashion.

The switch 203 is connected to contact point A between the first coil L1 and the second coil L2 by receiving the second control signal. At this time, the linear motor 200 is driven by receiving the alternating current power AC through only the first coil. That is, the switch 203 converts "the high efficiency mode" into "the overload corresponding mode" on the basis of the second control signal. In other words, the switch 203 decreases the number of winding of the motor coil, prevents the voltage deficiency phenomenon, and thus stably drives the linear motor. That is, when the linear motor is overloaded, the number of winding of the linear motor is varied to control the current applied to the motor, and thereby drives the linear motor in a stable fashion.

Hereinafter, when a current dead zone, where a current value output from the current detecting unit 201 is zero for a predetermined time, exists as shown in FIG. 4B, the controlling unit 202 outputs the first control signal for driving the linear motor 200 into 'the high efficiency mode' to the switch 203.

The switch 203 is connected to the B contact point of the second coil L2 by receiving the first control signal. That is, the linear motor 200 is driven by receiving the alternating current power AC through both the first coil and the second coil connected to the first coil in series.

In the meantime, the current detecting unit 201 can increase the current dead zone where a current value applied to the linear motor is zero for more than a predetermined time and output a current value corresponding to the increased current dead zone to the controlling unit 202, so that the controlling unit 202 can easily recognize that the linear motor is in 'the high efficiency mode'.

As aforementioned, the present invention decreases the harmonics loss by the triac which controls the alternating current power supplied to the linear motor 200 by varying the number of winding of the linear motor coil on the basis of the current supplied to the linear motor arranged in the linear compressor, and thereby increases the compressor efficiency. That is, in the present invention, when the current dead zone, where a current supplied to the motor arranged in the linear compressor is zero for a predetermined time exists, the number of winding of the linear motor coil is increased to decrease the current applied to the linear motor, thereby serving to decrease the harmonics loss by the triac which controls the alternating current power supplied to the linear motor 200 and thus serving to increase the efficiency of the linear compressor.

Also, in the present invention, since the number of winding of the linear motor coil varies on the basis of the current applied to the linear motor arranged in the linear compressor, when the linear motor is overloaded, the linear motor is stably driven. That is, in the present invention, when the current dead zone, where a current value supplied to the linear motor arranged in the linear compressor is not present at all, or the current dead zone is not present for a predetermined period time, that is, when the linear motor is overloaded, the number of winding of the linear motor coil is decreased to increase the current applied to the linear motor. As a result, when the linear motor is overloaded, the linear motor is stably driven.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus that controls driving of a linear motor, comprising:
    a detector that detects a current applied to the linear motor;
    a controller that outputs a control signal based on the detected current; and
    a switch that varies the number of windings of a linear motor coil on the basis of the control signal,
    wherein the linear motor comprises a first coil wound with a first predetermined number of windings and a second coil wound with a second predetermined number of windings and connected to the first coil in series.

2. The apparatus of claim 1, wherein when a current dead zone where a current value from the current detector unit is zero for a predetermined time exists, the controller outputs a first control signal to the switch to increase the number of winding of the linear motor coil.

3. The apparatus of claim 1, wherein when a current dead zone, where a current value output from the current detector is zero for a predetermined time does not exist, the controller outputs a second control signal to the switch to decrease the number of winding of the linear motor coil.

4. The apparatus of claim 1, wherein the controller outputs a first control signal to the switch to increase the number of winding of the linear motor coil when a current dead zone, where a current value output from the current detector is zero for a predetermined time exists, and outputs a second control signal to the switch to decrease the number of winding of the linear motor coil when the current dead zone does not exist.

5. The apparatus of claim 4, wherein the switch is connected to the first coil and the second coil when the first control signal is received, the first coil being connected to the second coil in series, and is connected to the first coil when the second control signal is received.

6. The apparatus of claim 1, wherein the switch varies the number of winding of the linear motor coil on the basis of the control signal and thereby varies a current applied to the linear motor.

7. The apparatus of claim 1, wherein the switch is a relay.

8. The apparatus according to claim 1, wherein said motor is installed in a linear compressor.

9. A method for controlling a driving of a linear motor, comprising:
    detecting a current applied to the linear motor;
    generating a control signal based on the detected current; and
    varying the number of windings of a linear motor coil on the basis of the control signal,
    wherein the linear motor comprises a first coil wound with a first predetermined number of windings and a second coil wound with a second predetermined number of windings and connected to the first coil in series.

10. The method of claim 9, wherein the generating the control signal comprises:
    generating a first control signal to increase the number of windings of the linear motor coil when a current dead zone, where a current value output from a current detecting unit is zero for a predetermined time exists, and
    generating a second control signal to decrease the number of windings of the linear motor coil when the current dead zone does not exist.

11. The method of claim 10, wherein the varying the number of winding of the linear motor coil comprises:
    supplying power to the linear motor through the second coil when the first control signal is received; and
    supplying power to the linear motor through the first coil when the second control signal is received.

12. The method of claim 9, wherein the number of winding of the linear motor coil varies on the basis of the control signal and a current applied to the linear motor varies due to a variation in the number of winding of the linear motor coil.

13. The method according to claim 9, wherein the linear motor is provided in a linear compressor.

* * * * *

UNITED STATES PATENT AND TRADEMARK OFFICE
CERTIFICATE OF CORRECTION

PATENT NO. : 6,998,736 B2  
APPLICATION NO. : 10/649629  
DATED : February 14, 2006  
INVENTOR(S) : Jae-Mo Lee et al.

Page 1 of 1

It is certified that error appears in the above-identified patent and that said Letters Patent is hereby corrected as shown below:

On the cover of the printed patent, at Item (56), References Cited, the following U.S. Patent Documents should be deleted pursuant to the Response Under 37 C.F.R. 1.111 filed July 20, 2005:

| | | | |
|---|---|---|---|
| 6,236,622 | 05/22/2001 | Blackman | 368/10 |
| 5,948,303 | 09/07/1999 | Larson | 219/486 |
| 5,282,181 | 01/25/1994 | Entner et al. | 368/73 |
| 5,089,998 | 02/18/1992 | Rund | 368/72 |
| 4,821,247 | 04/11/1989 | Grooms | 368/63 |
| 4,645,353 | 02/24/1987 | Kavoussi et al. | 368/12 |
| 4,370,602 | 01/25/1983 | Jones, Jr. et al. | 318/114 |
| 4,228,806 | 10/21/1980 | Lidow | 600/544 |
| 3,968,417 | 07/06/1976 | Dials | 320/107 |
| 3,798,889 | 03/26/1974 | Chadwick | 368/73 |
| 3,455,102 | 07/15/1969 | Wolf | 368/73 |
| 3,255,582 | 06/14/1966 | Zam | 368/250 |

Signed and Sealed this

Ninth Day of January, 2007

JON W. DUDAS  
*Director of the United States Patent and Trademark Office*